UNITED STATES PATENT OFFICE.

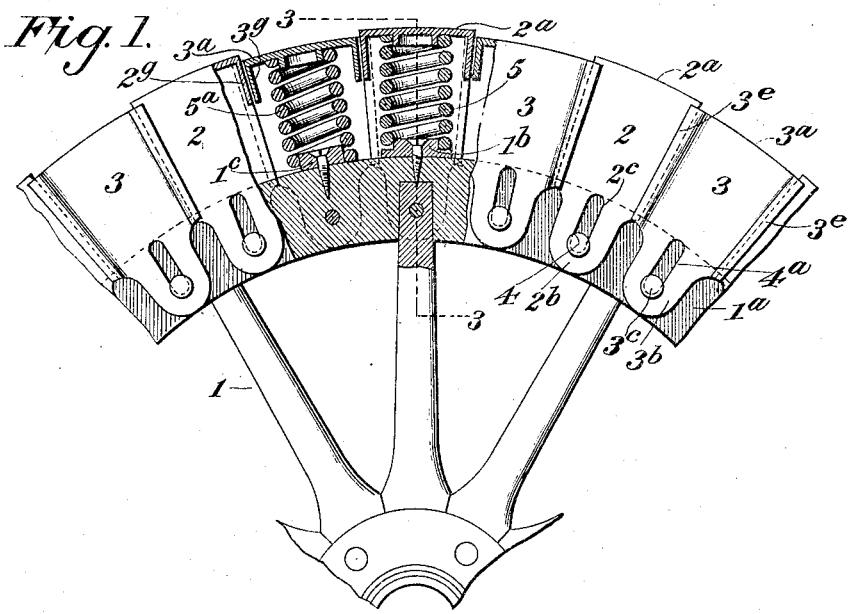
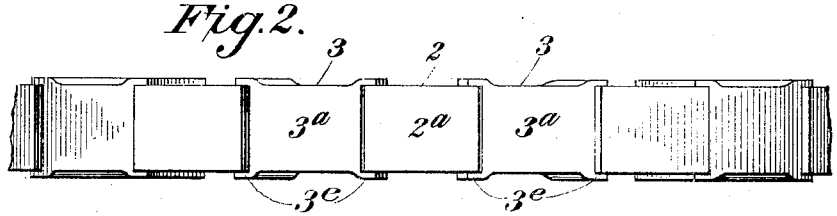
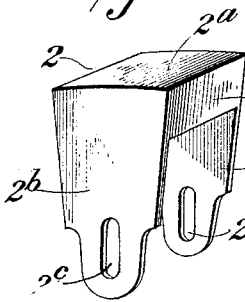
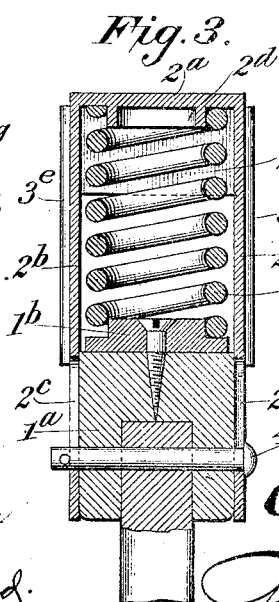
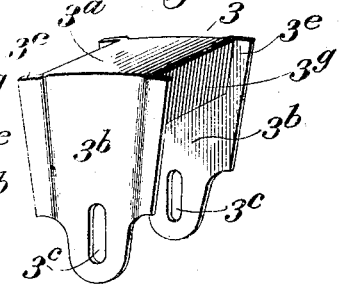

ALONZO C. MATHER, OF CHICAGO, ILLINOIS.

TIRE FOR VEHICLE-WHEELS.

1,050,674.  Specification of Letters Patent.  Patented Jan. 14, 1913.

Application filed February 1, 1909. Serial No. 475,397.

*To all whom it may concern:*

Be it known that I, ALONZO C. MATHER, a citizen of the United States, and resident of Chicago, in the county of Cook and State of Illinois, have invented certain new and useful Improvements in Tires for Vehicle-Wheels; and I hereby declare that the following is a full, clear, and exact description thereof, reference being had to the accompanying drawings, which form part of this specification.

This invention is an improvement in tires for vehicle wheels. Its object is to produce a resilient metal tire which will be light, strong, cheap, easily applied, of great durability, and easily repaired; and which will also be non-sliding, non-skidding; will not have the tendency to create dust that a rubber tire does, as it has practically no suction; and which will enable pneumatic tubes or elastic cushions and other sheaths or coverings to be dispensed with.

I will now explain the invention in detail with reference to the accompanying drawings which illustrate the present preferred embodiment thereof.

In said drawings—Figure 1 is a detail side elevation of part of a wheel equipped with such tire, some of the tire sections being also broken away to show the interior parts. Fig. 2 is an enlarged detail top plan view of part of the tire. Fig. 3 is an enlarged transverse section on line 3—3, Fig. 1. Figs. 4 and 5 are detail perspective views of two of the tire sections detached.

The vehicle wheel 1 may be of any suitable construction having a felly $1^a$ to which the resilient tire is attached. This tire is composed of a number of radially disposed U-shaped sections or casings 2 and 3 which are substantially alike, except for the slight differences hereinafter pointed out. Each section 2 is hollow and is provided with an imperforate outer or tread portion $2^a$, which forms part of the tread of the tire, and is provided with side portions $2^b$ which are adapted to embrace between their inner ends the opposite sides of the felly $1^a$, and are provided with slots $2^c$ for engagement of retaining bolts 4 which transfix the felly of the wheel, as shown. In this way the sections 2 are slidably connected to the felly and are capable of limited movement on radial lines, and are normally yieldingly held in their outermost positions by means of resilient cushions or springs within the sections interposed between the tread plates $2^a$ and the outer face of the felly $1^a$. These cushions or springs may be of any desired construction. In the drawings I have illustrated helical springs 5 which are positioned by engagement with a boss $2^d$ on the inner side of the tread plate of the section and with a bearing plate $1^b$ secured to the felly $1^a$ by a screw, or in other suitable manner.

The U-shaped tire sections 3 are constructed substantially like the sections 2, as thus far described; each having an outer tread plate $3^a$ and side plates $3^b$ having slots $3^c$ for engagement with a retaining bolt $4^a$ by which such section 3 is secured to the felly like the sections 2. The sections 3 are similarly yieldingly held in outermost position by means of resilient cushions or springs, indicated at $5^a$ in the drawings. The inner ends of springs $5^a$ being positioned on the felly by bearing plates of suitable construction, such for example as indicated at $1^c$. The sections 2 alternate with sections 3 entirely around the circumference of the wheel and the sections are sufficiently close together to form a practically continuous sectional tire. The sections 2 are preferably made slightly longer than sections 3 so that their tread plates $2^a$ normally project a little beyond the tread plates $3^a$. This is for the purpose of increasing the tractive effect of the tire, and gives the bearing surface of the tire a serrated or toothed appearance when viewed from the side, and causes it to bite more positively into the surface over which it is traveling; and furthermore this uneven surface of the tread causes a slightly different pressure to be exerted upon the sections 2 and 3 when in use, as the springs in sections 2 will be compressed before and more than the springs in sections 3 are compressed; and the springs will naturally tend to project sections 2 more forcibly than sections 3 and therefore will cause the sections 2 to act somewhat after the manner of spring-projected studs and bite the surface of the ground over which the wheel is moving; the sections being arranged close together will naturally reinforce each other against circumferential displacement, and the depending side plates $2^b$, $3^b$, will prevent lateral displacement of the sections on the felly. Relative lateral displacement of the sections is prevented by providing them with suitable interlocking flanges or projections; one simple means for this purpose, is to provide one section with projecting flanges or lips engaging the sides of the adjacent section. A convenient mode of construction is to provide the sections 3 with side flanges 3ᵉ adapted to embrace the sides of the adjacent sections 2 as indicated in the drawings, so that the sections are practically interlocked against relative lateral movement, while permitted radial or endwise relative movement,—the extent of such movement being controlled by the length of the slots 2ᶜ, 3ᶜ.

Each section 2 is shown as provided with short inwardly extending flanges 2ᵍ which unite with the tread plate 2ᵃ and the side plates 2ᵇ; the inner edges of these end flanges are sufficiently removed from the periphery of the felly to permit the desired radial movement of such section. The sections 3 are similarly provided with inwardly turned flanges 3ᵍ. The ends flanges of the section form a box, and greatly strengthen the bearing plate; and they also form wearing surfaces or bearing plates to receive lateral thrust of one section against the other. These end flanges also prevent dirt getting into the sections when radially displaced by the weight or pressure on the wheel. The sections thus constructed and arranged extend around the entire circumference of the wheel and form a complete resilient sectional tire therefor. In such tire each section is braced by two adjacent sections around the entire circumference of the wheel; each section is independently fastened to the felly and capable of a yielding movement in a radial direction; and it is also capable of being removed independently, of the other section and without effecting or displacing any of the other sections, by simply removing the screw bolt 4. The side flanges overlapping the joints at the meeting faces of the sections prevent relative lateral displacement of the sections and also largely prevent dirt from getting between and into the sections. The side and end flanges of each section constitute a kind of box to exclude dirt from the cushions and protect the latter from injury by external objects; the end flanges form wearing surfaces and bearing surfaces to transmit lateral thrust from one section to the other, so that the tractive strain or pressure on any one section is transmitted through these end plates to the adjacent sections, and so on practically around the entire circumference of the wheel.

A tire thus constructed is very simple and economical of construction. The sections being small a plurality of them will ordinarily come into play to support the weight of the wheel, and owing to the different lengths of alternate sections such a tire possesses, great tractive effect is produced.

I thus produce a tire composed wholly of closely adjacent sections which contain the resilient portions of the tire, and the resiliency and flexibility of such tire depends upon the stiffness of the cushions or springs in the sections. As the sections are set close together, each reinforces the adjacent section against lateral and circumferential deflection, and consequently the tendency of traction to bend the sections sidewise is resisted and overcome; for if it is attempted to push one section sidewise, such section immediately contacts the next, and thus the tractive strain is transmitted to and borne by a large number of sections in addition to those in immediate contact with the ground. The weight upon the wheel is supported and cushioned by a number of the sections, and while an individual section might be insufficient to carry the load, enough of them will always be in action to safely carry any load for which the tire is designed. Obviously such tire will resist slipping and skidding in the most effective manner, and will have a great tractive effect. It obviates suction in passing over the ground, it is not liable to skid, nor to slip, and it can pass over small obstructions without jolting the wheel, as the sections can yield singly or collectively to small obstructions in the road, according to the size of the obstruction passed over. The tire moreover is handsome in appearance, and will not be put out of commission even if through untoward circumstances some of the cushions or sections should be broken; and such damages can be readily repaired.

Having described my invention what I claim as new and desire to secure by Letters Patent is:

In combination, a wheel body, a resilient metallic tire formed of a series of closely adjacent radially movable U-shaped sections slidingly connected to the wheel felly, the outer portions of said sections forming the tread of the tire, alternate sections being of different length to make the tread uneven and cause it to bite the ground, said sections having inwardly turned end flanges abutting against each other to exclude dirt and side flanges to prevent lateral relative displacement of adjacent sections, and cushioning springs within the sections interposed between the periphery of the felly and the outer portions of the sections.

In testimony that I claim the foregoing as my own, I affix my signature in presence of two witnesses.

ALONZO C. MATHER.

Witnesses:
 JESSE M. WATKINS,
 CLARA L. MARTIN.